(12) United States Patent
Nakamura

(10) Patent No.: US 6,321,880 B2
(45) Date of Patent: *Nov. 27, 2001

(54) DETACHABLE FLUID COOLING SYSTEM FOR BICYCLE DISC BRAKE

(75) Inventor: Yasushi Nakamura, Itami (JP)

(73) Assignee: Shimano Inc., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/781,404

(22) Filed: Feb. 13, 2001

Related U.S. Application Data

(62) Division of application No. 09/111,709, filed on Jul. 8, 1998, now Pat. No. 6,196,358.

(51) Int. Cl.$^7$ .................... F16D 65/853; F16D 65/84; B62L 1/00; B62L 3/00
(52) U.S. Cl. ................ 188/71.6; 188/24.11; 188/264 R; 188/264 D
(58) Field of Search ............... 188/71.6, 264 D, 188/264 P, 264 CC, 264 R, 24.11–24.22, 344; 192/113.31, 113.3

(56) References Cited

U.S. PATENT DOCUMENTS

| | | |
|---|---|---|
| 3,530,965 | 9/1970 | Wilson . |
| 3,648,814 | 3/1972 | Barron . |
| 3,776,333 | 12/1973 | Mathauser . |
| 4,391,352 | 7/1983 | Brown . |
| 4,508,200 | * 4/1985 | Cigognini .............. 188/71.6 |
| 4,754,856 | 7/1988 | Villata . |
| 5,394,963 | 3/1995 | Deane et al. . |
| 5,445,242 | 8/1995 | Pogorzelski et al. . |
| 5,558,183 | 9/1996 | Way . |
| 6,170,617 | * 1/2001 | Nakamura ............. 188/71.6 |
| 6,196,358 | * 3/2001 | Nakamura ............. 188/71.6 |
| 6,202,802 | * 3/2001 | Nakamura ............. 188/71.6 |

FOREIGN PATENT DOCUMENTS

| | | |
|---|---|---|
| 33 40 410 A1 | 5/1985 | (DE) . |
| 198 07 392 A1 | 9/1998 | (DE) . |
| 62278330 | * 12/1987 | (JP) . |
| 62-278330 A1 | 12/1987 | (JP) . |
| 2159431 | * 6/1990 | (JP) . |
| 2-159431 A1 | 6/1990 | (JP) . |
| 681867 | * 3/1994 | (JP) . |
| 6-74271 A1 | 3/1994 | (JP) . |
| 6-81865 A1 | 3/1994 | (JP) . |
| 6-81867 A1 | 3/1994 | (JP) . |
| 6-109048 A1 | 4/1994 | (JP) . |
| 6-94060 A1 | 4/1994 | (JP) . |
| 6341474 | * 12/1994 | (JP) . |
| 8-170669 A1 | 7/1996 | (JP) . |
| 8-230627 A1 | 9/1996 | (JP) . |
| 9-53671 A1 | 2/1997 | (JP) . |
| 9-53672 A1 | 2/1997 | (JP) . |
| 9-151967 A1 | 6/1997 | (JP) . |

\* cited by examiner

*Primary Examiner*—Douglas C. Butler
(74) *Attorney, Agent, or Firm*—Shinjyu Global IP Counselors, LLP

(57) ABSTRACT

A bicycle disc brake caliper is provided with a detachable cooling system that transfers heat away from the actuating fluid. Basically, the bicycle disc brake caliper has a housing and a piston unit, with a coolant member of the cooling system attached to the housing. The housing has a frame mounting member sized to be coupled to a portion of a bicycle frame. The piston unit is movably coupled to the housing between a release position, in which the piston unit is spaced from a brake disc mounted to a wheel of a bicycle, and a braking position, in which the piston unit engages the brake disc of the bicycle wheel. The coolant member has a coolant area for receiving coolant to create a coolant heat sink that transfers heat from the housing. The housing has an actuating passage in fluid communication with the piston unit to move the piston unit via an actuating fluid. In one embodiment, the cooling system includes a pump and a reservoir. In another embodiment, a coolant or water bottle is attached to the coolant member for manually adding coolant thereto. In another embodiment, the coolant member is filled with a high specific heat gel.

29 Claims, 15 Drawing Sheets

DETACHABLE FLUID COOLING SYSTEM FOR BICYCLE DISC BRAKE

CROSS-REFERENCE TO RELATED APPLICATION

This application is a divisional application of copending U.S. patent application Ser. No. 09/111,709, filed Jul. 8, 1998, now U.S. Pat. No. 6,196,358.

BACKGROUND OF THE INVENTION

1. Field of the Invention

This invention generally relates to cooling a bicycle disc brake for stopping rotation of a bicycle wheel of a bicycle. More specifically, the present invention relates to a detachable fluid cooling system, which is adapted to be coupled to a disc brake of a bicycle.

2. Background Information

Bicycling is becoming an increasingly popular form of recreation as well as a means of transportation. Moreover, bicycling has become a very popular competitive sport. Whether the bicycle is used for recreation, transportation or competition, the bicycle industry is constantly improving their components. One particular component of the bicycle which has been extensively redesigned over the past years is the braking systems of bicycles.

There are several types of bicycle brake devices, which are currently available on the market. Examples of some types of common bicycle brake devices include rim brakes, caliper brakes and disc brakes. If a rider wants a very high performance brake system, then the rider typically wants a disc brake system. Disc brake systems provide a substantial braking power in relationship to the amount of braking force applied to the brake lever. Moreover, disc brake systems typically provide a high level of consistency in all types of weather and riding conditions. However, one problem with disc brakes is that the hydraulic or actuating fluid can become overheated such that vapor-lock occurs. In other words, the heat generated by braking results in the hydraulic fluid increasing in volume so as to cause the brake pads to engage the brake disc even when the brake lever is in the release position. When vapor-lock occurs, the bicycle wheels can lock up and throw the rider off of the bicycle.

In the prior art disc brake systems, several methods have been utilized to avoid vapor-lock. For example, the caliper housing can be made larger to absorb more heat. Another method has been to make a larger brake disc with a wider surface area. Also, vapor-lock can be suppressed by utilizing high quality hydraulic fluid. Yet another method to avoid vapor-lock has been to use brake or friction pads which do not transfer the heat to the brake housing as readily as conventional friction pads. These prior art methods of avoiding vapor-lock have many problems. One particular problem, is that these solutions often are expensive to manufacture. Also, some of these prior art solutions are not completely effective.

In view of the above, there exists a need for a fluid cooled disc brake for a bicycle which overcomes the above-mentioned problems in the prior art. This invention addresses these needs in the prior art as well as other needs, which will become apparent to those skilled in the art from this disclosure.

SUMMARY OF THE INVENTION

One object of the present invention is to provide a bicycle disc brake with a fluid cooling system.

Another object of the present invention is to provide a bicycle disc brake with a fluid cooling system, which is replaceable and detachable Another object of the present invention is to provide an improved bicycle disc brake, which is reliable and durable.

In accordance with one aspect of the present invention, a bicycle disc brake caliper with detachable a cooling member that transfers heat away from the actuating fluid. Basically, the bicycle disc brake caliper has a housing, a piston unit and a coolant member. The housing has a frame mounting member sized to be coupled to a portion of a bicycle frame. The piston unit is movably coupled to the housing between a release position, in which the piston unit is spaced from a brake disc mounted to a wheel of a bicycle, and a braking position, in which the piston unit engages the brake disc of the bicycle wheel. The coolant member is coupled to the housing. The coolant member has a coolant area for receiving coolant to create a coolant heat sink that transfers heat from the housing. The housing has an actuating passage in fluid communication with the piston unit to move the piston unit via an actuating fluid.

The foregoing objects of the present invention can be attained by providing a detachable fluid cooling system for a bicycle disc brake caliper, comprising: an attachment portion sized to be detachable coupled to the bicycle disc brake caliper; and a coolant portion coupled to said attachment portion to contact the bicycle disc brake caliper for transferring heat from the bicycle disc brake caliper, said coolant portion having an internal coolant area for containing coolant.

In one embodiment, the cooling system includes a pump and a reservoir. In another embodiment, a coolant or water bottle is attached to the coolant member for manually adding coolant thereto. In another embodiment, the coolant member is filled with a high specific heat gel. Yet in other embodiments, the coolant member is adjustable to be oriented with its outlet opening substantially perpendicular to the ground.

Other objects, advantages and salient features of the present invention will become apparent to those skilled in the art from the following detailed description, which, taken in conjunction with the annexed drawings discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
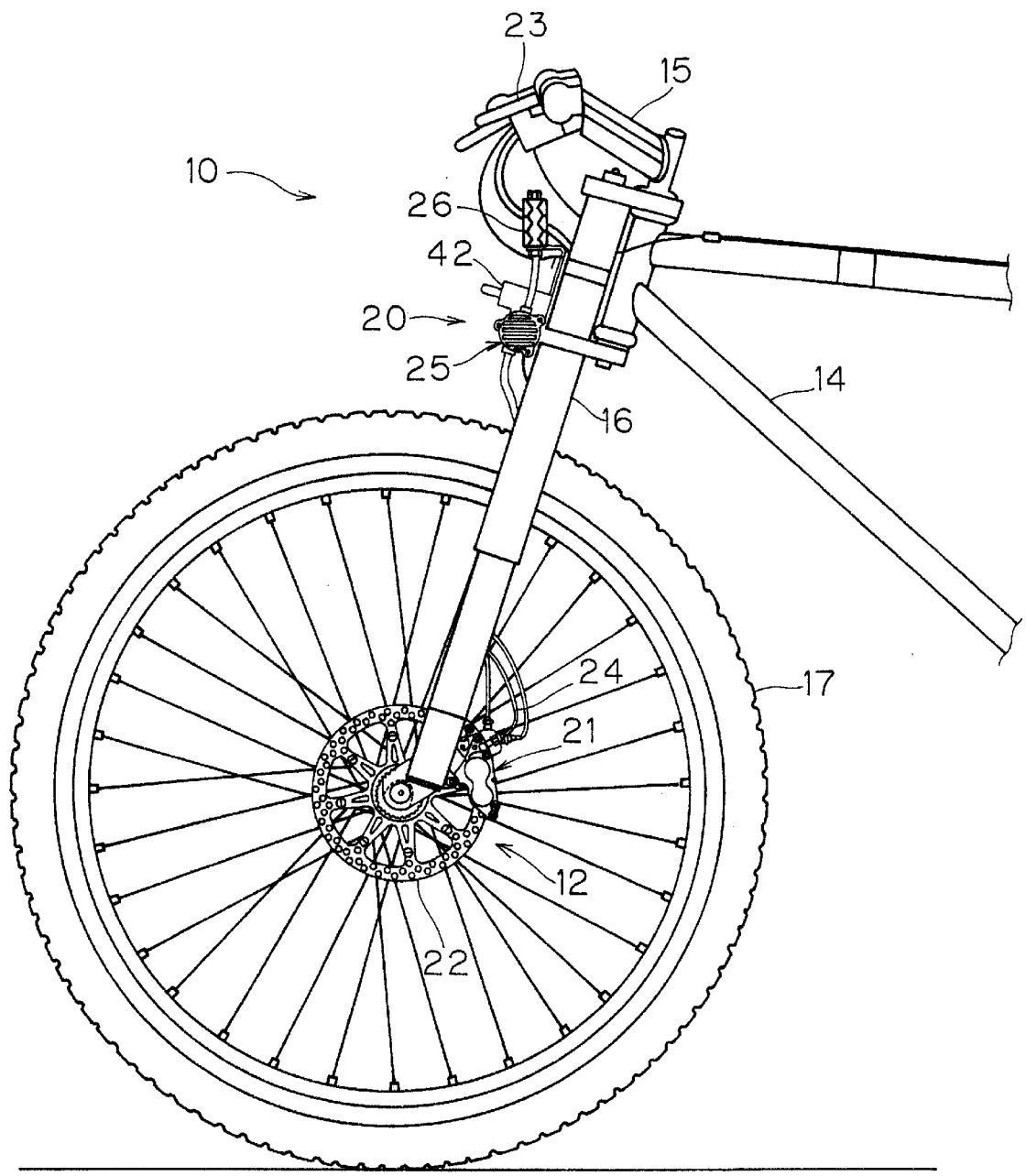
FIG. 1 is a side elevational view of a portion of a bicycle with a fluid cooled bicycle disc brake assembly coupled thereto in accordance with one embodiment of the present invention.
Figure 2:
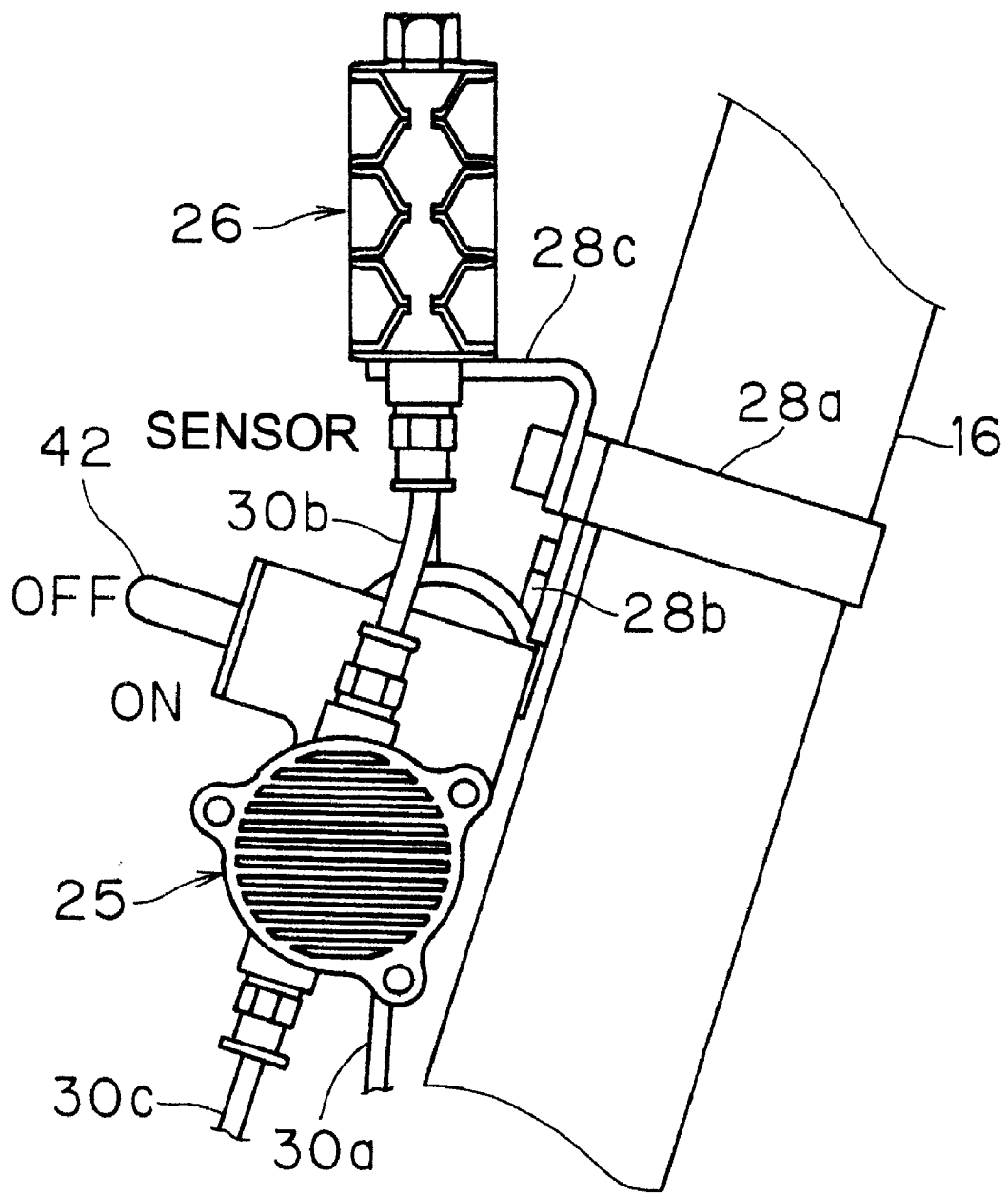
FIG. 2 is a partial side elevational view of a portion of the front fork of the bicycle with the radiator, motor and pump of the cooling system coupled thereto in accordance with the embodiment of the present invention illustrated in FIG. 1.
Figure 3:
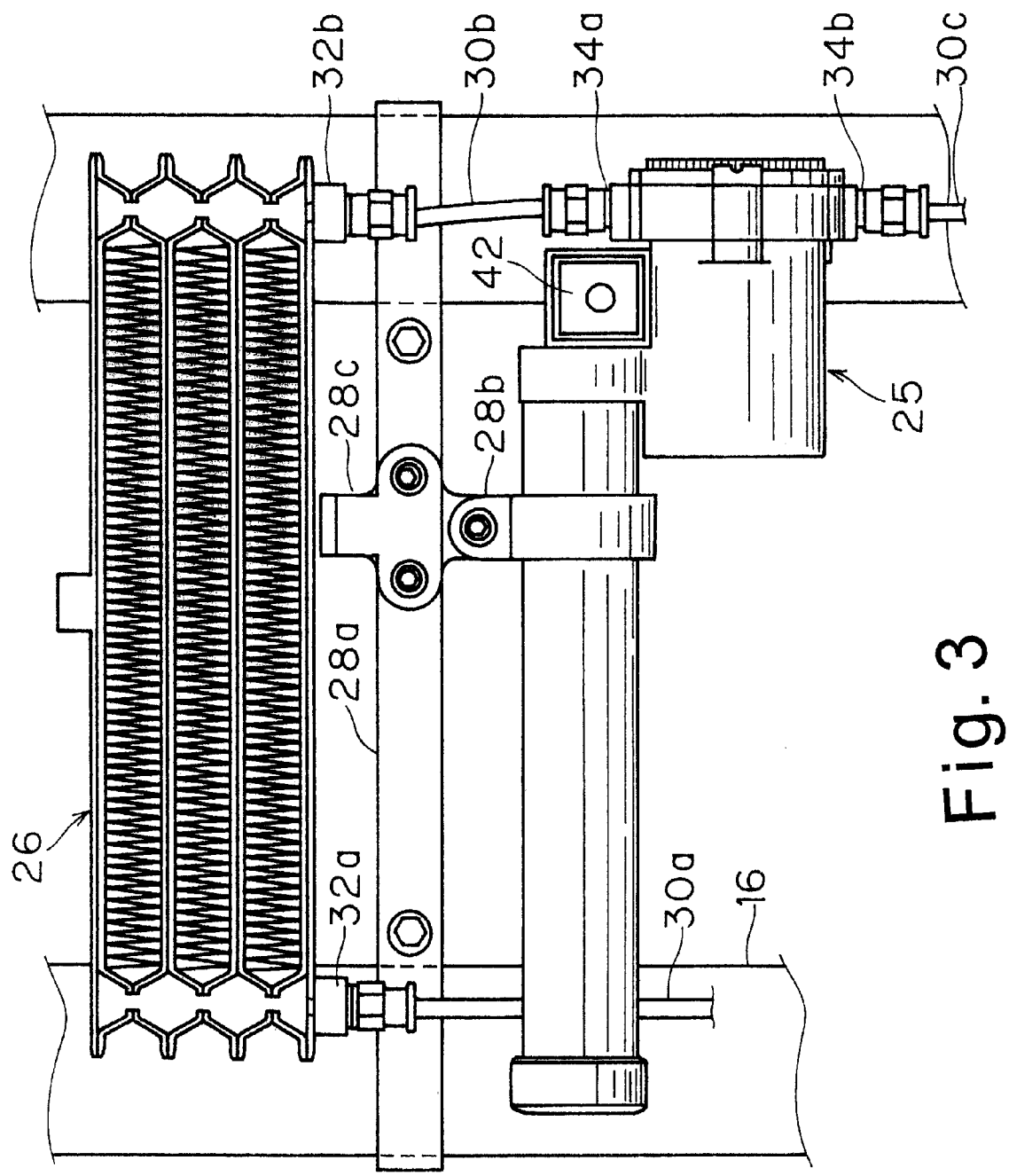
FIG. 3 is a partial front elevational view of a portion of the front fork of the bicycle with the radiator, motor and pump of the cooling system coupled thereto in accordance with the embodiment of the present invention illustrated in FIG. 1.

Referring initially to FIG. 1, a front portion of a bicycle 10 is illustrated with a fluid cooled disc brake assembly 12 coupled thereto in accordance with one embodiment of the present invention. Bicycles such as bicycle 10 are well known in the art, and thus, bicycle 10 and its various components will not be discussed or illustrated in detail herein. It will be apparent to those skilled in the art that bicycle 10 can be any type of bicycle, e.g., mountain bike, a hybrid bike or a road bike. Bicycle 10 is a conventional bicycle, which basically includes a bicycle frame 14 with a handle bar 15, front and rear forks 16 (only front fork shown), front and rear wheels 17 (only front wheel shown) and a drive train (not shown).

While only the front portion of bicycle 10 is illustrated as having a fluid cooled disc brake assembly 12, it will be apparent to those skilled in the art from this disclosure that a second fluid cooled disc brake assembly 12 can be utilized for stopping the rear wheel of bicycle 10. Moreover, it will also be apparent to those skilled in the art from this disclosure that various changes and modifications can be made from the embodiments disclosed herein without departing from the scope of the invention as defined in the appended claims.

Fluid cooled disc brake assembly 12 basically includes a cooling system 20, a disc brake caliper 21, a disc brake 22 and a brake operating mechanism 23. Cooling system 20 is basically mounted on the front fork 16 of bicycle 12. Likewise, disc brake caliper 21 is also mounted on front fork 16 of bicycle 12 adjacent brake disc 22. Brake disc 22 is fixedly coupled to front wheel 17 for rotation therewith. Brake operating mechanism 23 is preferably fixedly mounted on handle bar 15 adjacent the hand portion of handle bar 15. Accordingly, brake operating mechanism 23 is operated such that disc brake caliper 21 moves from a release position in which bicycle wheel 17 and brake disc 22 are free to rotate, and a braking position in which disc brake caliper 21 applies a braking force against brake disc 22 to stop rotation of bicycle wheel 17 and brake disc 22. Cooling system 20 is preferably designed to prevent vapor lock from occurring within disc brake caliper 21. Specifically, cooling system 20 is preferably designed to act as a coolant heat sink that transfers heat from disc brake caliper 21.

Turning now to FIGS. 3–6, a portion of cooling system 20 is illustrated in more detail. Cooling system 20 basically includes a coolant member 24 (FIG. 6), pump 25 and radiator 26. In this embodiment, coolant member 24 is a detachable and replaceable member, which is fixedly coupled to disc brake caliper 21 to create a coolant heat sink which transfers heat away from disc brake caliper 21 as explained below in more detail. Of course, it will be apparent to those skilled in the art from this disclosure that coolant member 24 integrally formed with a portion of disc brake caliper 21 to create a coolant heat sink which transfers heat away from disc brake caliper 21. Coolant member 24 will be discussed in more detail below together with the description of disc brake caliper 21.

Preferably, pump 25 and radiator 26 are mounted to front fork 16 of bicycle 10 by a mounting bracket assembly. The mounting bracket assembly includes a cross-strap 28a and a pair of intermediate straps 28b and 28c. Accordingly, pump 25 and radiator 26 are mounted as a compact unit on fork 16.

Pump 25 is preferably a rotary pump which moves coolant through coolant member 24 and radiator 26. In particular, as seen in FIGS. 3–6, a first flexible conduit 30a extends from coolant member 24 to an inlet opening 32a of radiator 26, a second flexible conduit 30b extends from an outlet opening 32b of radiator 26 to an inlet opening 34a of pump 25, and a third flexible tubing 30c extends from an outlet 34b of pump 25 to coolant member 24. Accordingly, conduits 30a, 30b and 30c form a continuous loop or conduit path between coolant member 24, pump 25 and radiator 26. Coolant is forced through the conduit path by pump 25 for removing heat from coolant member 24 and disc brake caliper 21.

Figure 4:
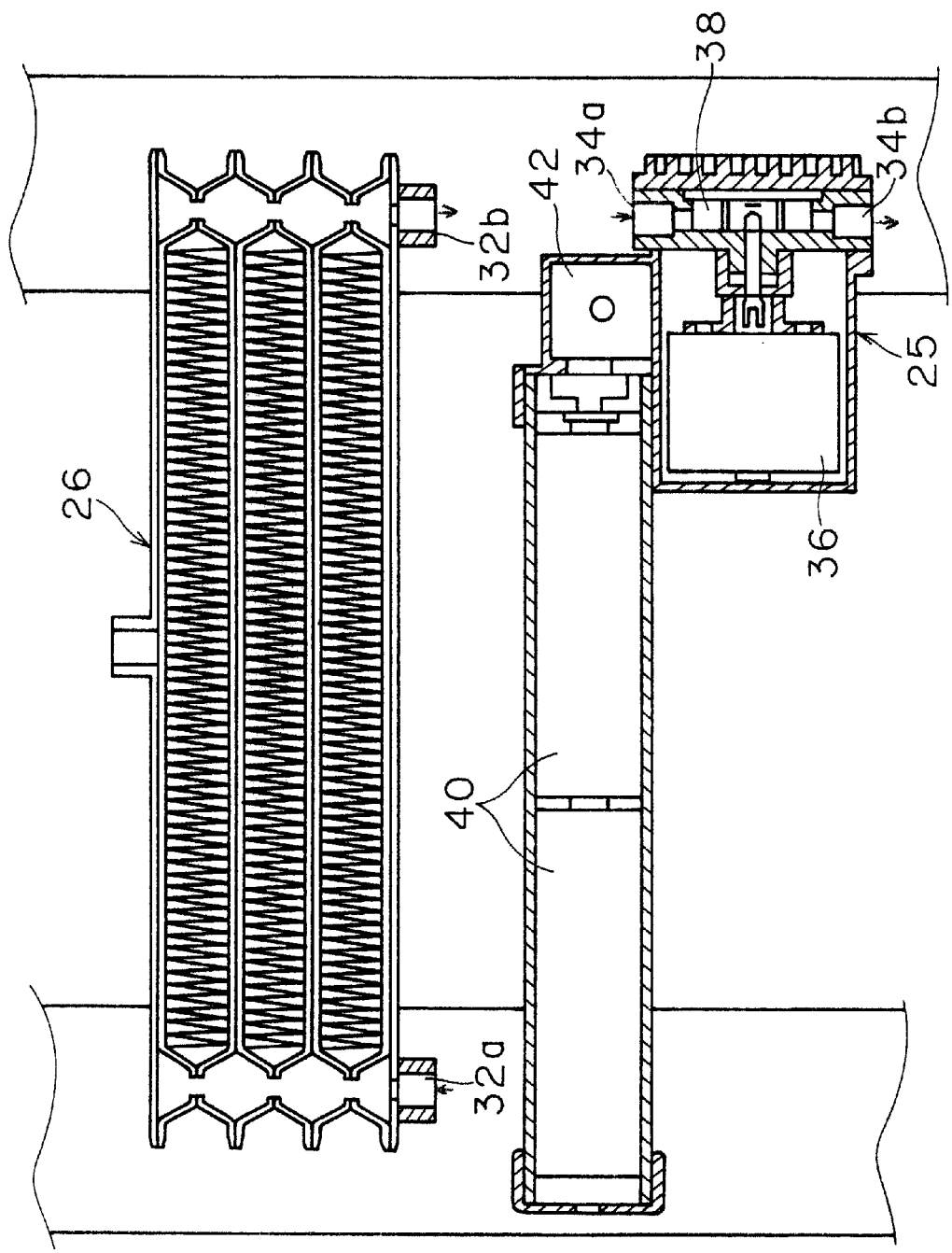
FIG. 4 is a partial cross-sectional view of the radiator, motor and pump of the cooling system coupled to a portion of the front fork of the bicycle in accordance with the embodiment of the present invention illustrated in FIG. 1.
Figure 5:
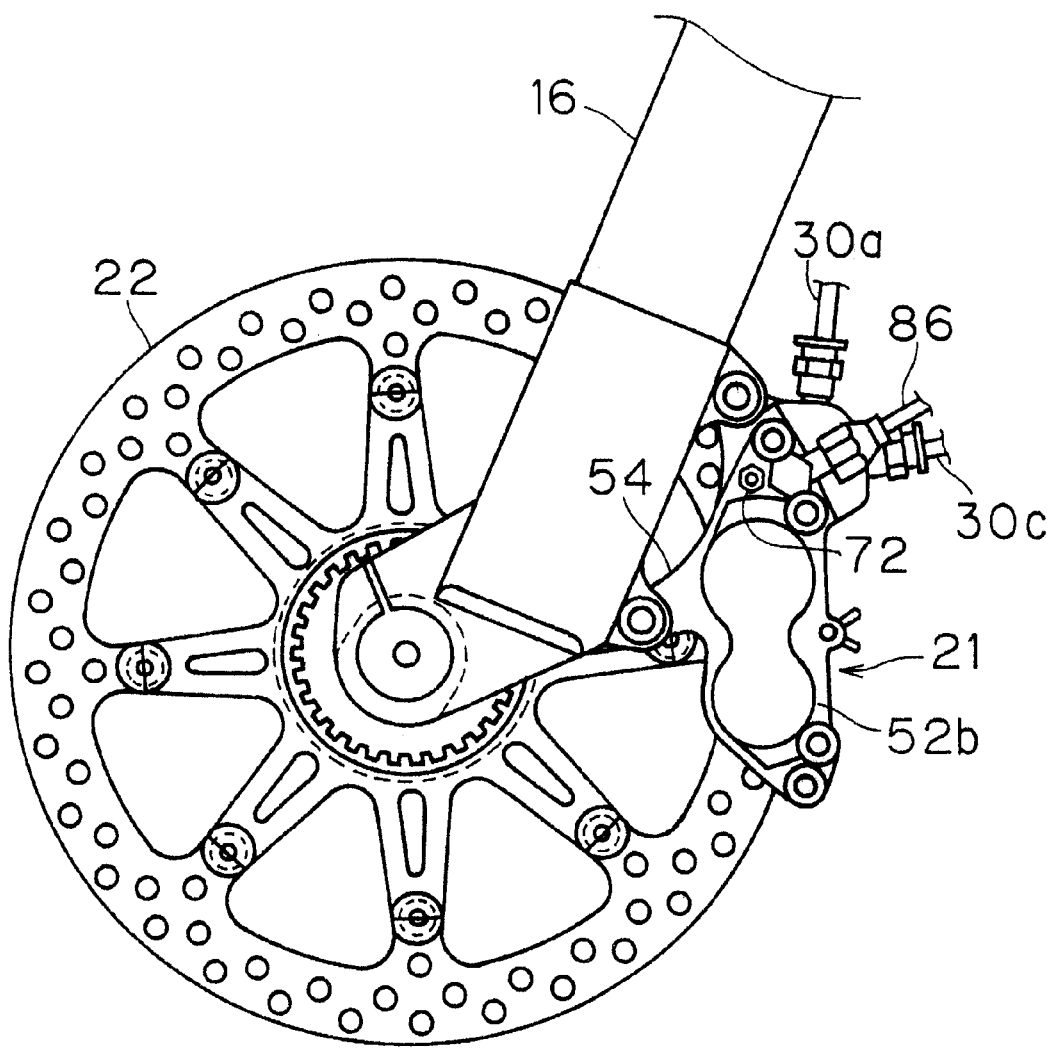
FIG. 5 is a partial side elevational view of a portion of the fluid cooled bicycle disc brake assembly coupled to the front fork of the bicycle in accordance with the embodiment of the present invention illustrated in FIG. 1.
Figure 6:
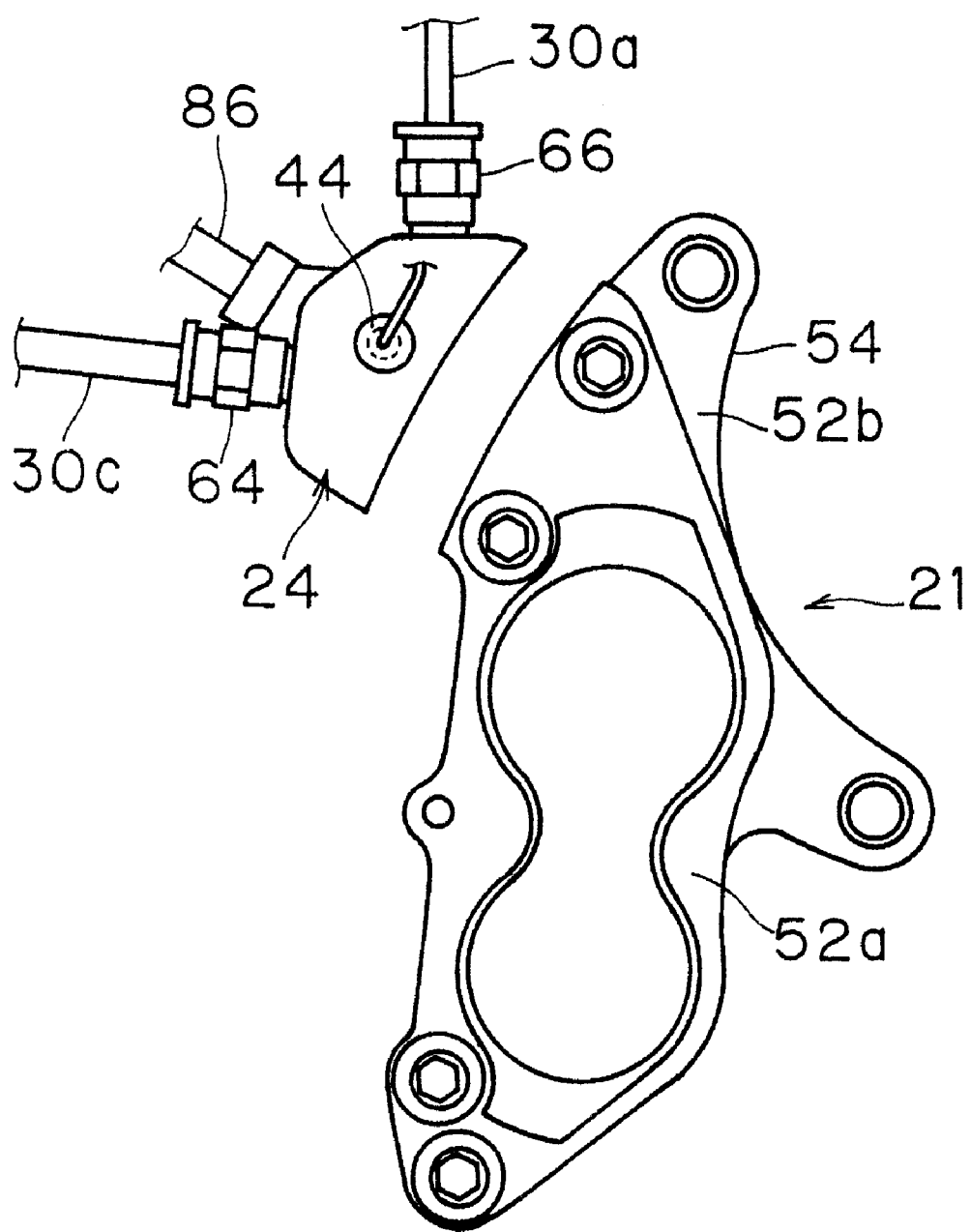
FIG. 6 is a side elevational view of a bicycle disc brake caliper of the fluid cooled bicycle disc brake assembly in accordance with the embodiment of the present invention illustrated in FIG. 1.

As best shown in FIG. 4, pump 25 is preferably operated by a motor 36 which rotates an impeller 38 to force fluid for coolant through pump 25. Motor 36 in the preferred embodiment is an electric motor that is battery operated. More specifically, two conventional batteries 40 are utilized to power motor 36. A three-positioned switch 42 is provided for controlling the operation of motor 36. Specifically, switch 42 has a central off position, an on position and a sensor position. In the off position, motor 36 is idle, and thus, pump 25 is not operated. In the on position, motor 36 turns impeller 38 of pump 25 to force fluid or coolant through the conduit path of cooling system 20. The sensor position operates motor 36 based on the temperature of the coolant or disc brake caliper 21. In particular, as seen in FIG. 6, a sensor 44 is mounted to disc brake caliper 21 to determine the temperature of either the coolant or the housing of disc brake caliper 21. Accordingly, switch 42 and motor 36 are electrically coupled to sensor 44 such that motor 36 only operates when the temperature of the coolant and/or housing of disc brake caliper 21 reaches a predetermined temperature level, e.g., greater than 80° C. Once the coolant or disc brake caliper 21 reaches this predetermined temperature level, motor 36 will operate to turn impeller 38 for pumping coolant or fluid through coolant member 24 and radiator 26 to reduce the temperature of caliper 21.

It will be apparent to those skilled in the art that other types of pumping systems, motors and temperature sensors can be utilized in the cooling system 20 of the present invention. For example, a pump can be used in which the pump is operated by rotating parts of the bicycle 10. Moreover, pumps, motors and sensors such as pump 25, motor 36 and sensor 44 are well known in the prior art. Thus, these parts will not be described or illustrated in detail.

Radiator 26 is preferably a conventional type of radiator, which includes a conduit path with a large surface area so as to be air-cooled. Since radiator 26 is relatively conventional in construction, radiator 26 will not be described or illustrated in detail herein.

It will be apparent to those skilled in the art that pump 25 and/or radiator 26 can be eliminated. For example, the conduit path can be set up as a "coffee percolator" such that the coolant is self-circulating through coolant member 24.

Turning now to FIGS. 5–9, disc brake caliper 21 will now be described in more detail. Disc brake caliper 21 is fixedly coupled to fork 16 adjacent to brake disc 22 for applying a clamping force to stop the rotation of bicycle wheel 17 and brake disc 22. Disc brake caliper 21 basically includes a housing 50, a piston unit 51 and coolant member 24 which is fixedly coupled thereto via fastening means such as adhesive, straps, bolts, rivets or other fasteners. Coolant member 24 is preferably constructed two halves, which are fixedly secured together.

Disc brake caliper 21 is basically a conventional disc brake caliper except that cooling system 20 has been coupled to it for removing heat therefrom. More specifically, except for the addition of coolant member 24 to disc brake caliper 21, the structure and function of disc brake caliper 21 is relatively conventional. Therefore, disc brake caliper 21 will not be discussed or illustrated in detail herein.

Figure 7:
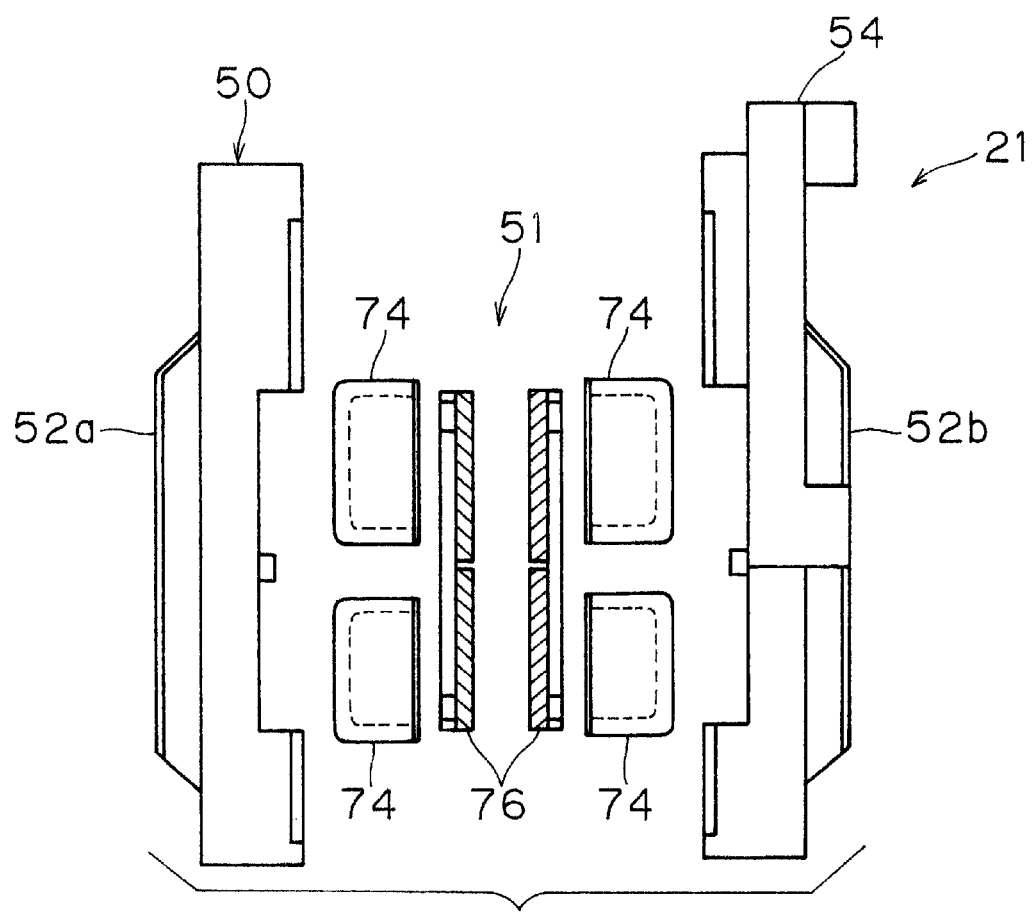
FIG. 7 is an exploded front elevational view of the bicycle disc brake caliper of the fluid cooled bicycle disc brake assembly in accordance with the embodiment of the present invention illustrated in FIG. 1.
Figure 8:
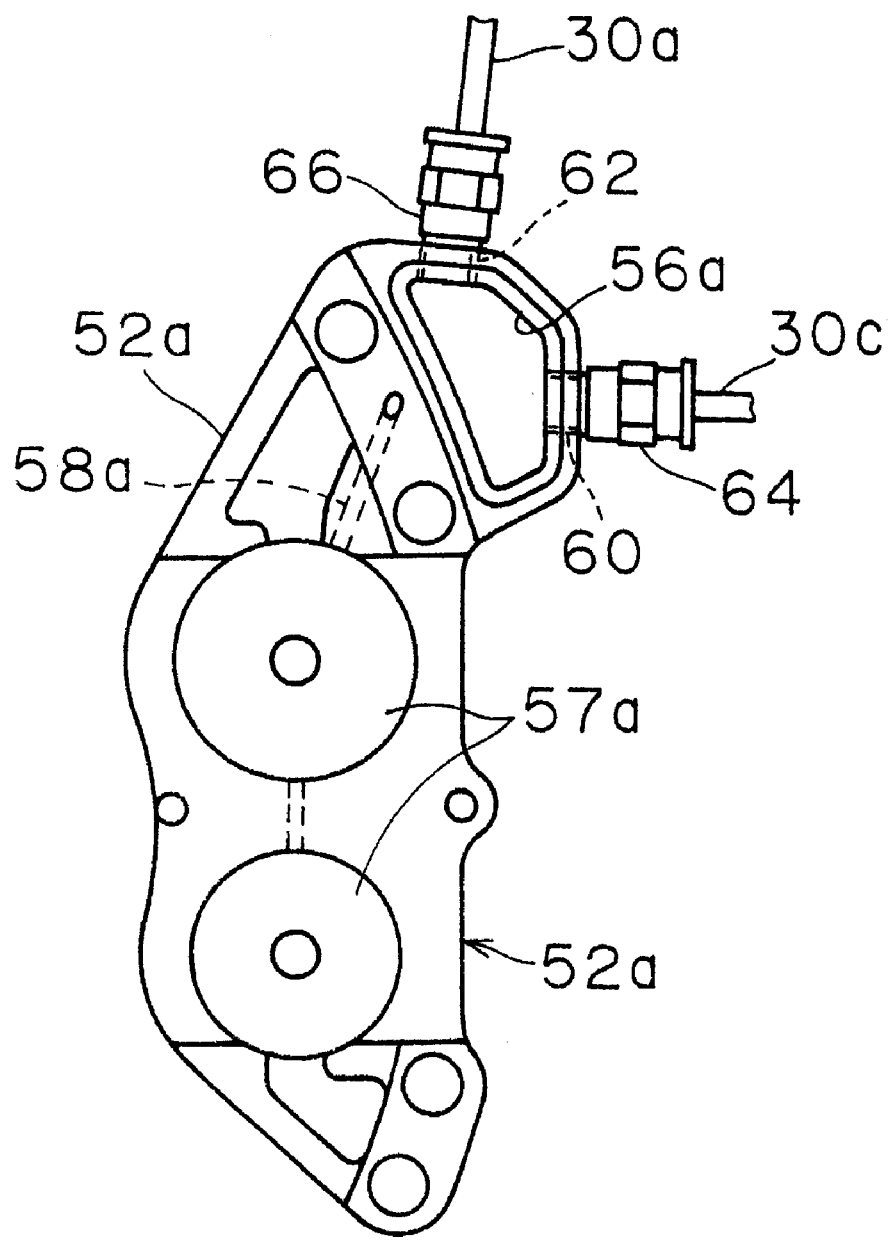
FIG. 8 is an inside elevational view of a first housing half of the bicycle disc brake caliper of the fluid cooled bicycle disc brake assembly in accordance with the embodiment of the present invention illustrated in FIG. 1.
Figure 9:
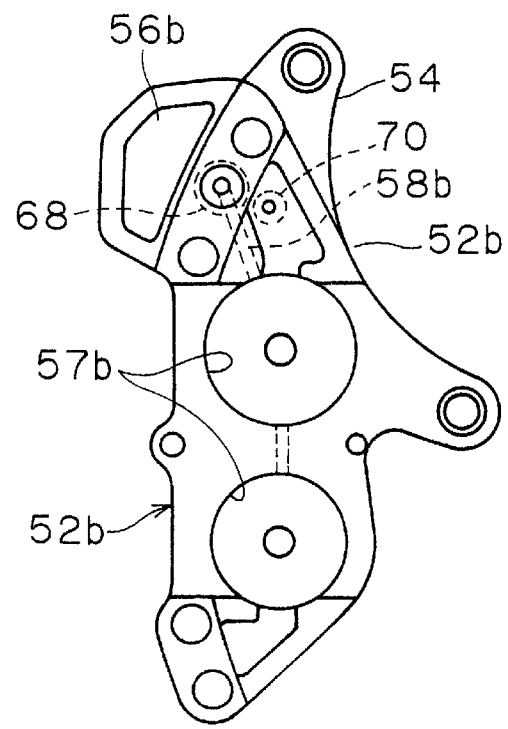
FIG. 9 is an inside elevational view of a second housing half of the bicycle disc brake caliper of the fluid cooled bicycle disc brake assembly in accordance with the embodiment of the present invention illustrated in FIG. 1.

As seen in FIGS. 7–9, housing 50 is preferably constructed of a heat conductive material, which can readily transfer the heat to the coolant. For example, housing 50 can be constructed of aluminum. Housing 50 includes a first housing half 52a and a second housing half 52b which are bolted together in a conventional manner. For all practical purposes, first and second housing halves 52a and 52b are substantially identical in construction, except that second housing half 52b has brake operating mechanism 23 attached thereto for supplying an actuating fluid to first and second housing halves 52a and 52b. Also, second housing half 52b has a pair of outwardly extending flanges that form a mounting member 54 for bolting disc brake caliper 21 to fork 16 of bicycle 10. When housing halves 52a and 52b are bolted together, a disc brake slot is formed therebetween for receiving brake disc 21 therebetween.

As seen in FIGS. 8 and 9, first housing half 52a has a pair of circular piston recesses 57a and an internal fluid actuating passage 58a. Likewise, second housing half 52b has a pair of piston receiving recesses 57b and an internal fluid actuating passage 58b. A first half of coolant member 24 is coupled to the first housing half 52a, while a second half of coolant member 24 is coupled to the second housing half 52b. The first half of coolant member 24 has a coolant cavity or area 56a, while a second half of coolant member 24 has a coolant cavity or area 56b. Cavities or areas 56a and 56b form a large coolant chamber. Preferably, coolant member 24 can hold at least approximately ten cubic centimeters to approximately twenty cubic centimeters.

The first half of coolant member 24 has an inlet opening 60 and an outlet opening 62. Inlet opening 60 is preferably a threaded hole, which receives a connector 64 to connect conduit 30c thereto. Outlet opening 62 is also preferably a threaded bore having an outlet connector 66 coupled thereto to connect conduit 30a thereto. Connectors 64 and 66 are preferably provided with one-way valves or check valves that allow the fluid or coolant to pass into coolant cavities 56a and 56b through inlet opening 60 and out of coolant cavities 56a and 56b via outlet opening 62.

Internal fluid actuating passage 58a extends between circular piston recesses 57a and internal fluid actuating passage 58b of second housing half 52b. In other words, the actuating fluid from brake operating mechanism 23 flows into second housing half 52b and then into internal fluid actuating passages 58a and 58b to operate piston unit 51.

Second housing half 52b has a first threaded opening 68, which is in fluid communication with internal fluid actuating passage 58b. Opening 68 is designed for attaching a hydraulic or actuating fluid conduit thereto. A second opening 70 is also provided for threadedly receiving a bleed nipple 72. Opening 70 is in fluid communication with internal fluid actuating passage 58b such that excess air can be removed from the actuating system. Internal fluid actuating passage 58b interconnects piston recesses 57b together for receiving actuating fluid or hydraulic fluid to activate piston unit 51.

As seen in FIG. 7, piston unit 51 preferably includes four pistons 74 and a pair of friction pads 76. Pistons 74 are slidably received in piston recesses 57a and 57b for movement between a release position and a braking position. Friction pads 76 are located on the free ends of pistons 74 for movement therewith. In other words, as pistons 74 move from a release position to a braking position, friction pads 76 also move from a release position to a braking position. In the braking position, friction pads 76 frictionally engage brake disc 22 to stop the rotation of brake disc 22 and wheel 17. In the release position, friction pads 76 are spaced from brake disc 22 to allow brake disc 22 and wheel 17 to freely rotate therebetween. Pistons 74 and friction pads 76 are moved from their release positions to their braking positions by actuating or hydraulic fluid applying a force to pistons 74. More specifically, as brake operating mechanism 23 is actuated, actuating fluid is pressurized so as to force pistons 74 and friction pads 76 toward brake disc 22.

When brake caliper 21 is coupled to front fork 16, coolant member 24 is positioned on the downstream end of the disc brake caliper 21. In other words, as seen in FIG. 1, brake disc 22 rotates in a counterclockwise direction such that the coolant member 24 is positioned downstream on disc brake caliper 21 in relationship to the rotational direction of brake disc 22. This allows the heat to be removed from the downstream end of brake caliper 21 more quickly since this is the area in which the actuating fluid is being supplied and the area of increased heat.

Figure 10:
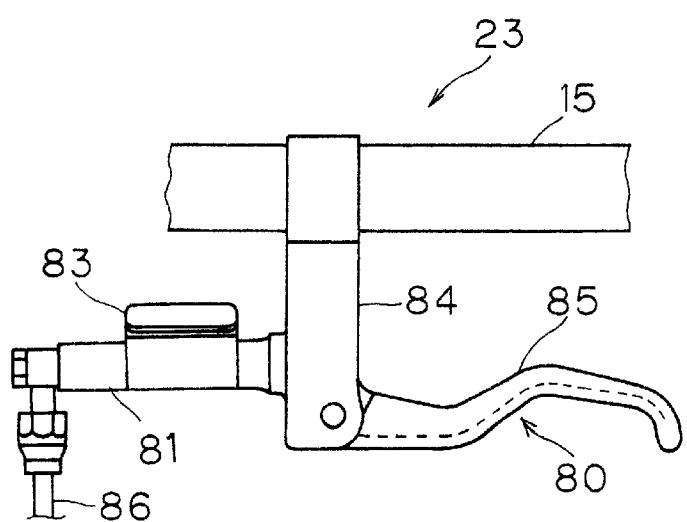
FIG. 10 is a top plan view of a bicycle brake operating device for the fluid cooled bicycle disc brake assembly in accordance with the embodiment of the present invention illustrated in FIG. 1.
Figure 11:
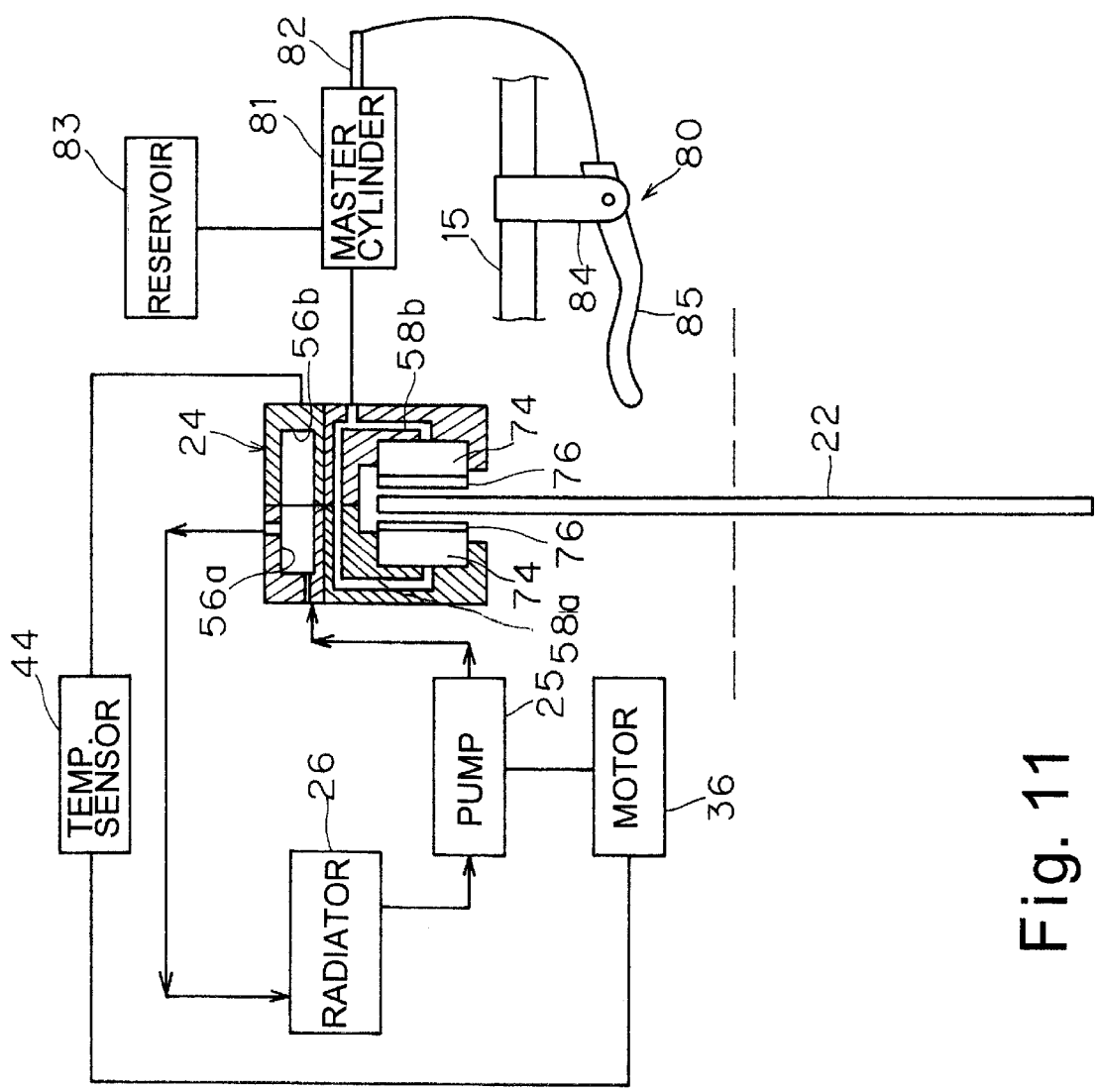
FIG. 11 is a schematic diagram of the fluid cooled bicycle disc brake assembly in accordance with the embodiment of the present invention illustrated in FIG. 1.

Referring now to FIGS. 10 and 11, brake operating mechanism 23 will now be described in more detail. Basically, brake operating mechanism 23 is designed to actuate the disc brake caliper 21 to apply a forcible gripping action on brake disc 22 to stop rotation of front wheel 17. Brake operating mechanism 23 basically includes a brake lever 80, a hydraulic or master cylinder 81, a hydraulic or master piston 82, and an actuation fluid reservoir 83.

Preferably, brake operating mechanism 23 is a single unit which is mounted on handlebar 15. In particular, brake lever 80 includes a mounting portion 84 and a lever portion 85. Mounting portion 84 is designed to be clamped onto handle bar 15 in a conventional manner. Mounting portion 84 is integrally formed with master cylinder 81 such that master cylinder 81, master piston 82 and actuation fluid reservoir 83 are all supported on mounting portion 84 of brake lever 80. Lever portion 85 is pivotally coupled to mounting portion 84 for movement between a release position and a braking position. Normally, lever portion 84 is maintained in a release position in a conventional manner.

Master piston 82 is movably mounted within master cylinder 81 in a conventional manner. More specifically, actuation fluid reservoir 83 is mounted on master cylinder 81 and in fluid communication with the interior bore of master cylinder 81 for supplying actuation fluid thereto. Master piston 82 is connected at one end to lever portion 85 for axially moving master piston 82 within master cylinder 81. Accordingly, actuation of lever portion 85 causes master piston 82 to move axially within master cylinder 81. This movement of master piston 82 within master cylinder 81 directs fluid pressure through a hydraulic line 86 which is coupled to disc brake caliper 21. Thus, the pressurized actuation fluid causes the pistons 74 and friction pads 76 to move so as to engage brake disc 22 to stop rotation of wheel 17.

SECOND EMBODIMENT

Figure 12:
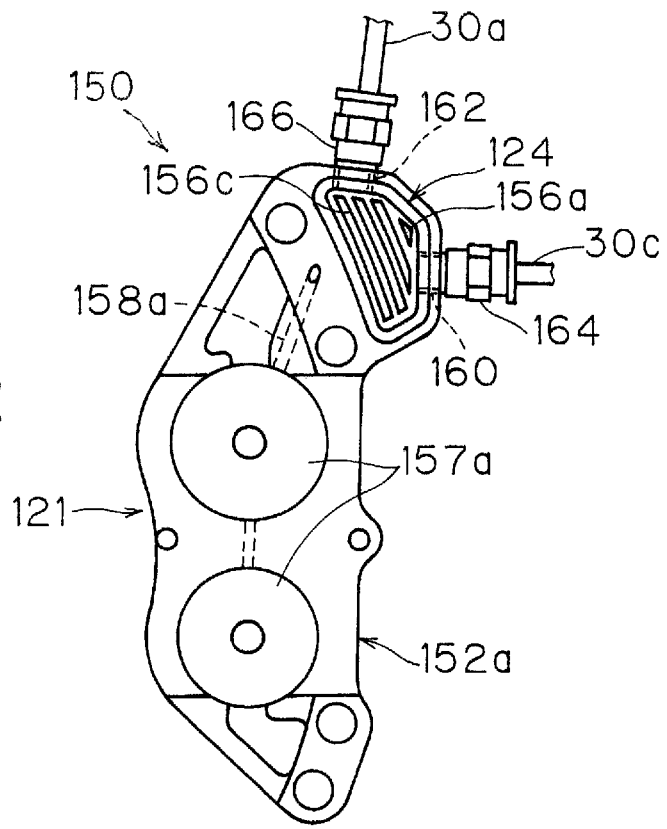
FIG. 12 is an inside elevational view of a modified first housing half of the bicycle disc brake caliper of the fluid cooled bicycle disc brake assembly in accordance with another embodiment of the present invention.
Figure 13:
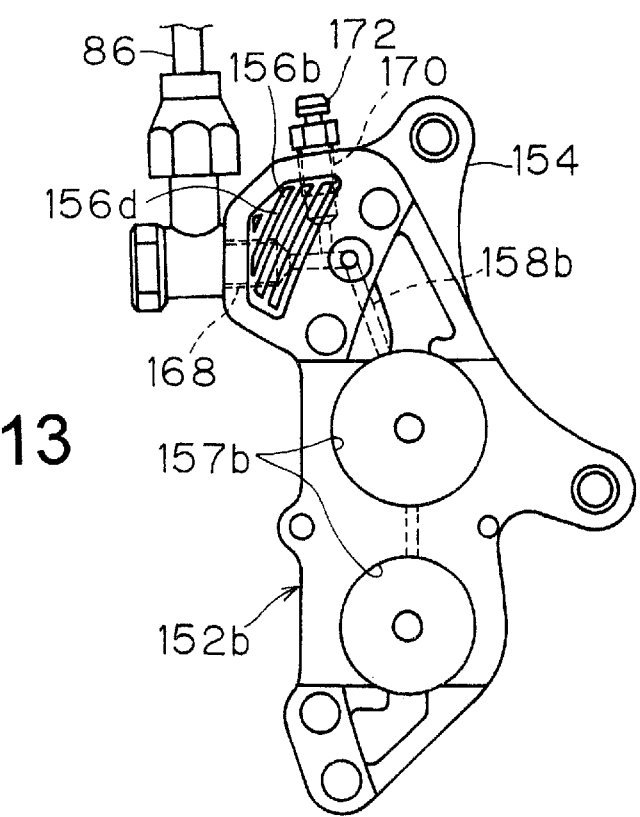
FIG. 13 is an inside elevational view of a modified second housing half of the bicycle disc brake caliper of the fluid cooled bicycle disc brake assembly in accordance with the embodiment of the present invention illustrated in FIG. 12.

Referring now to FIGS. 12 and 13, a modified disc brake caliper 121 is illustrated in accordance with the present invention. Disc brake caliper 121 is designed to be utilized in fluid cooled disc brake assembly 12, discussed above. In fact, disc brake caliper 121 is substantially identical to disc brake caliper 21 except that disc brake caliper 121 has its cooling cavities or areas 156a and 156b provided with an internal conduit path and coolant member 124 is integrally formed with a portion of disc brake caliper 121. Of course, it will be apparent to those skilled in the art from this disclosure that coolant member 124 can be a separable member which is fixedly coupled to disc brake caliper 121 to create a coolant heat sink which transfers heat away from disc brake caliper 21. More specifically, baffles 156c and 156d are formed within coolant cavities or areas 156a and 156b, respectively. In view of the similarities between disc brake caliper 21 and 121, disc brake caliper 121 and its connection to cooling system 20 will not be discussed or illustrated in detail herein.

Housing 150 is preferably constructed of a heat conductive material, which can readily transfer the heat to the coolant. For example, housing 150 can be constructed of aluminum. Housing 150 includes a first housing half 152a and a second housing half 152b which are bolted together in a conventional manner. For all practical purposes, first and second housing halves 152a and 152b are substantially identical in construction, except that housing half 152a has coolant system 20 attached thereto, and second housing half 152b has brake operating mechanism 23 attached thereto for supplying an actuating fluid to first and second housing halves 152a and 152b. Also, second housing half 152b has a pair of outwardly extending flanges that form a mounting member 154 for bolting disc brake caliper 121 to fork 16 of bicycle 10. When housing halves 152a and 152b are bolted together, a disc brake slot is formed therebetween for receiving brake disc 121 therebetween.

First housing half 152a has a coolant cavity or area 156a, a pair of circular piston recesses 157a and an internal fluid actuating passage 158a. Likewise, second housing half 152b has a coolant cavity or area 156a, a pair of piston receiving recesses 157b and an internal fluid actuating passage 158b. Cavities or areas 156a and 156b form a large coolant chamber. Preferably, coolant member 124 can hold at least approximately ten cubic centimeters to approximately twenty cubic centimeters.

Coolant cavity or area 156a is a large chamber having an inlet opening 160 and an outlet opening 162. Inlet opening 160 is preferably a threaded hole, which receives a connector 164 to connect conduit 30c thereto. Outlet opening 162 is also preferably a threaded bore having an outlet connector 166 coupled thereto to connect conduit 30a thereto. Connectors 164 and 166 are preferably provided with one-way valves or check valves that allow the fluid or coolant to pass into coolant cavities 156a and 156b through inlet opening 160 and out of coolant cavities 156a and 156b via outlet opening 162.

Internal fluid actuating passage 158a extends between circular piston recesses 157a and internal fluid actuating passage 158b of second housing half 152b. In other words, the actuating fluid from brake operating mechanism 23 flows into second housing half 152b and then into internal fluid actuating passages 58a and 158b to operate the piston unit.

Second housing half 152b has a first threaded opening 168, which is in fluid communication with internal fluid actuating passage 158b. Opening 168 is designed for attaching a hydraulic or actuating fluid conduit thereto. A second opening 170 is also provided for threadedly receiving a bleed nipple 172. Opening 170 is in fluid communication with internal fluid actuating passage 158b such that excess air can be removed from the actuating system. Internal fluid actuating passage 158b interconnects piston recesses 157b together for receiving actuating fluid or hydraulic fluid to activate the piston unit.

THIRD EMBODIMENT

Figure 14:
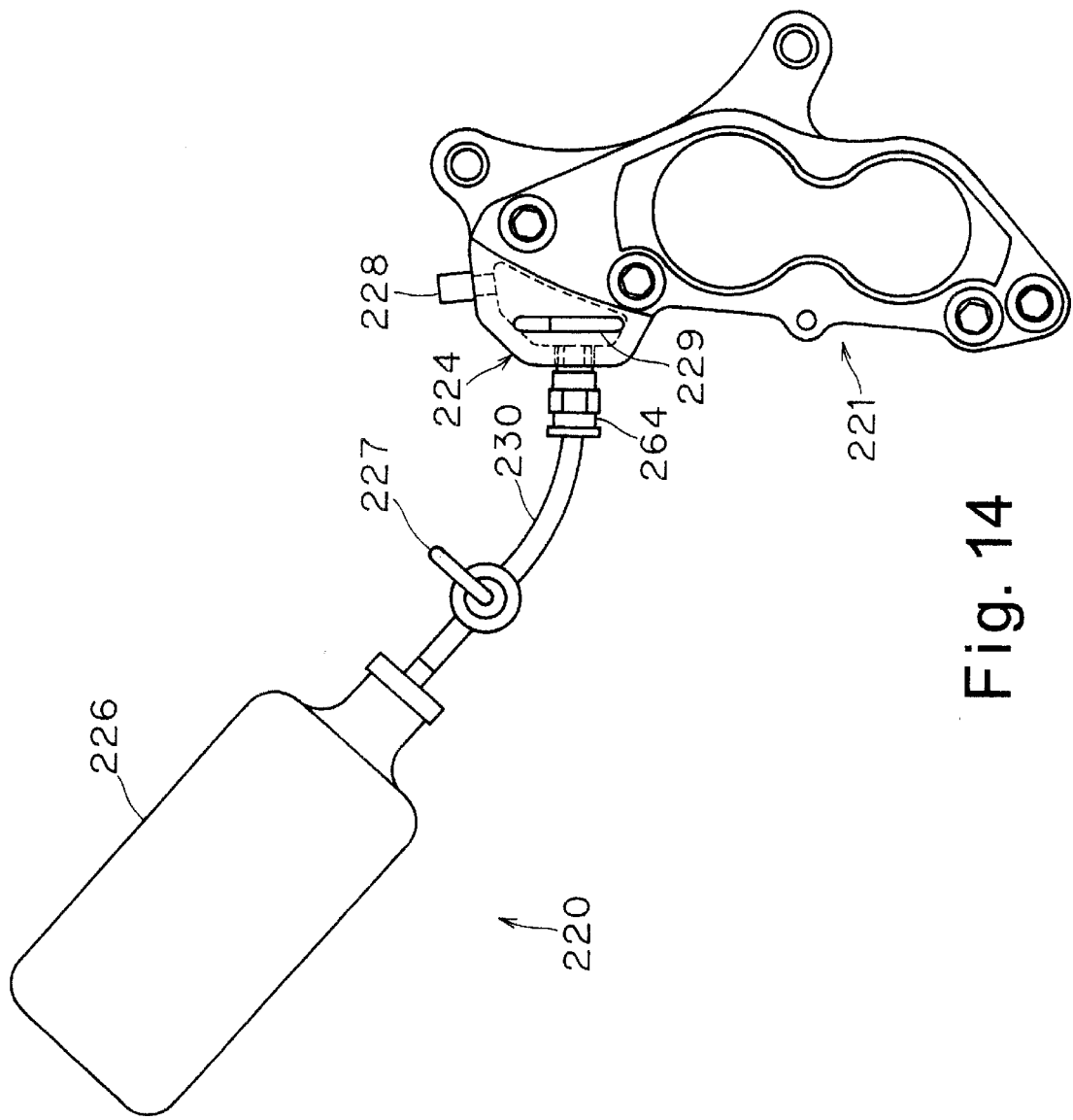
FIG. 14 is a side elevational view of selected parts of a fluid cooled bicycle disc brake assembly in accordance with another embodiment of the present invention.

Referring now to FIG. 14, a simplified cooling system 220. Basically, cooling system 220 includes coolant member 224, coolant bottle or tank 226, an on/off valve 227 and a pressure release valve 228. Disc brake caliper 221 is substantially identical to disc brake caliper 21 discussed above, except that a coolant gauge 229 has been added to the integral coolant member 224 to visually inspect the amount of coolant or water contained within coolant member 224.

In view of the similarities between disc brake caliper 221 and disc brake caliper 21 of the first embodiment, disc brake caliper 221 will not be discussed or illustrated in detail herein. Moreover, it will be apparent to those skilled in the art from this disclosure that disc brake caliper 221 can be utilized on bicycle 10 of the first embodiment so as to be operated by brake operating mechanism 23 of the first embodiment to engage brake disc 22.

In this embodiment, cooling system 220 is designed such that the rider can manually add water or coolant periodically to coolant member 224. More specifically, the water or coolant within coolant member 224 will be heated when the friction pads engage brake disc 22. The heated water or coolant will turn into steam or coolant vapor if the brake disc caliper 221 gets too hot. This steam will open pressure release valve 228 such that the water or coolant vapor is released. Thus, the amount of coolant within coolant member 224 will gradually be reduced. The rider then can look at coolant gauge 229 to determine when coolant needs to be added. The rider will then open the on/off valve 227 to allow additional water of coolant from coolant bottle 226 to flow through conduit 230 into coolant member 224.

Water or coolant bottle 226 can be attached to any portion of the frame as needed and/or desired. For example, water bottle 226 can be attached to the front fork 16 of bicycle 10 in the same location as radiator 26 of the first embodiment of FIG. 1. Preferably, the location of water bottle 226 is such that the rider can operate on/off valve 227 without stopping. Moreover, water bottle 226, valve 227 and conduit 230 are preferably easily detachable from coolant member 224 such that they can be replaced if damaged. A one-way valve 264 preferably connects conduit 230 to the inlet opening of coolant member 224.

FOURTH EMBODIMENT

Figure 15:
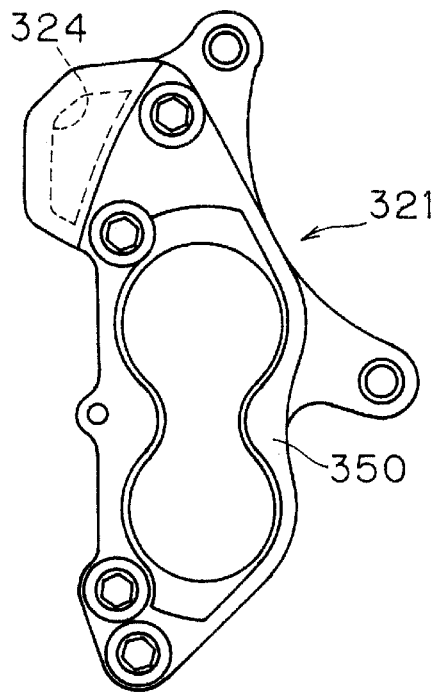
FIG. 15 is a side elevational view of a bicycle disc brake caliper with a closed coolant chamber or member in accordance with another embodiment of the present invention.

As seen in FIG. 15, a modified disc brake caliper 321 is illustrated. Disc brake caliper 321 is substantially identical to disc brake caliper 21 of the first embodiment except that the internal coolant member 324 is a closed unit, which has a high specific heat gel located therein. While coolant member 324 is illustrated as being detachable, it will be apparent to those skilled in the art from this disclosure that coolant member 324 can be made integral with housing 350. Thus, this system is a simplified version of the first embodiment. The high specific heat gel located in coolant member 324 can be any high specific heat gel, which can operate under the normal operating conditions of a bicycle disc brake.

In view of the similarities between disc brake caliper 321 and disc brake caliper 21 of the first embodiment, disc brake caliper 321 will not be discussed or illustrated in detail herein. Moreover, it will be apparent to those skilled in the art from this disclosure that disc brake caliper 321 can be utilized on bicycle 10 of the first embodiment so as to be operated by brake operating mechanism 23 of the first embodiment to engage brake disc 22.

FIFTH EMBODIMENT

Figure 16:
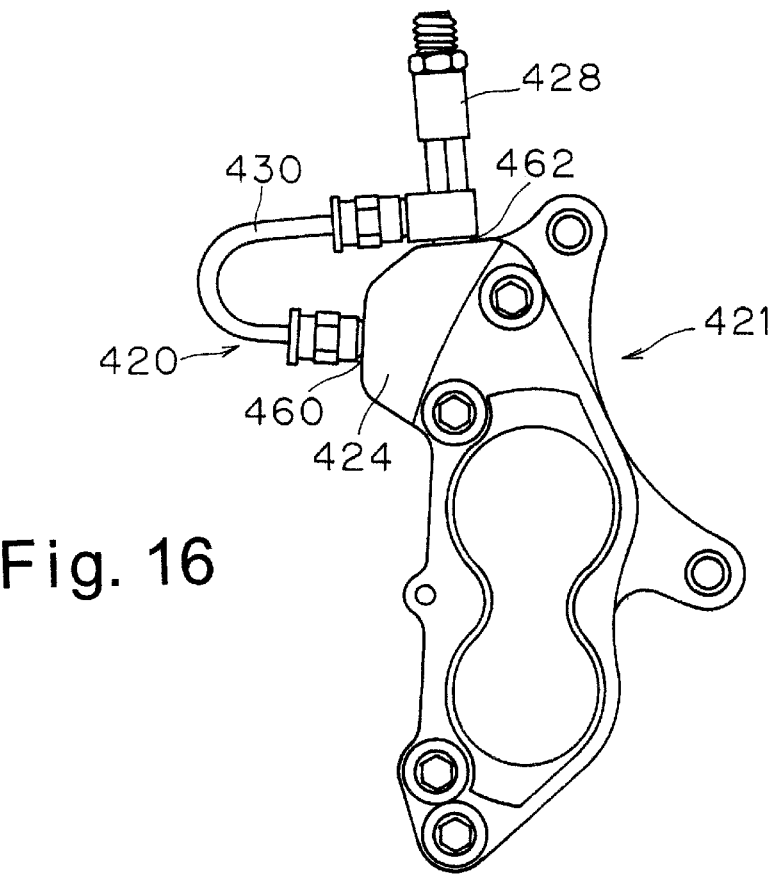
FIG. 16 is a side elevational view of a bicycle disc brake caliper with a refillable coolant chamber or member in accordance with another embodiment of the present invention.

Referring now to FIG. 16, a modified disc brake caliper 421 is illustrated in accordance with the present invention. In this embodiment, the coolant inlet opening 460 and coolant outlet opening 462 are interconnected together via a transparent conduit 430. This transparent conduit 430 allows the rider to inspect the coolant level within the coolant member 424. Also, a pressure release valve/refill valve 428 has been added such that additional coolant or fluid can be added as needed and/or steam or coolant vapor be released from the coolant member 424.

Disc brake caliper 421 is substantially identical to disc brake caliper 21 except that disc brake caliper 421 has transparent conduit 430 extending between its inlet opening 460 and coolant outlet opening 462 and pressure release valve/refill valve 428 has been added. In view of the similarities between disc brake caliper 421 and disc brake caliper 21 of the first embodiment, brake disc caliper 421 will not be discussed or illustrated in detail herein.

In this embodiment, cooling system 420 is designed such that the rider can manually add water or coolant periodically to coolant member 424 via pressure release valve/refill valve 428. More specifically, the water or coolant within coolant member 424 will be heated when the friction pads engage brake disc 22. The heated water or coolant will turn into steam or coolant vapor if the disc brake caliper 421 gets too hot. This steam will open pressure release valve/refill valve 428 such that the water or coolant vapor is released. Thus, the amount of coolant within coolant member 424 will gradually be reduced. The rider then can look at transparent conduit 430 to determine when coolant needs to be added. The rider will then add additional water of coolant to coolant member 424 via pressure release valve/refill valve 428.

SIXTH EMBODIMENT

Figure 17:
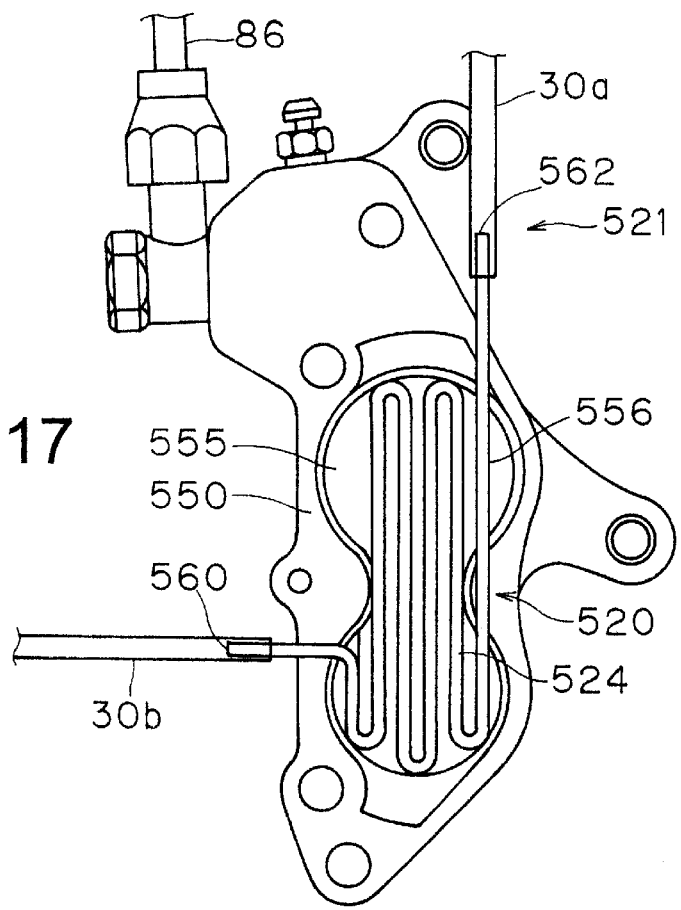
FIG. 17 is a side elevational view of a bicycle disc brake caliper with a replaceable coolant chamber or member in accordance with another embodiment of the present invention.
Figure 18:
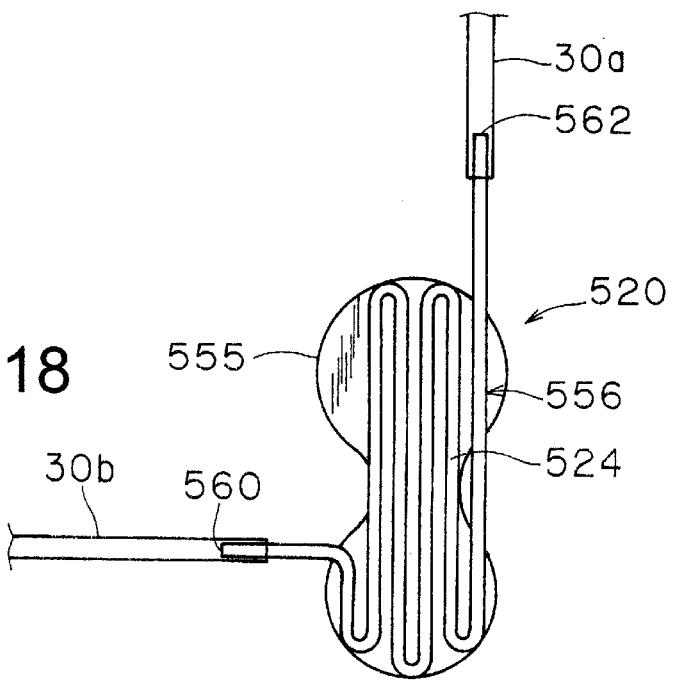
FIG. 18 is a side elevational view of replaceable coolant chamber or member illustrated in FIG. 17.

Referring now to FIGS. 17 and 18, a modified disc brake caliper 521 is illustrated in accordance with the present invention. In embodiment, a detachable and replaceable cooling system or unit 520 is fixedly attached to the disc brake caliper 521. Cooling system or unit 520 includes a mounting member 555 with a piping system 556 fixedly secured thereto. Piping system 556 forms the coolant member 524.

Mounting member 555 is shaped for mounting on housing 550 of disc brake caliper 521. Mounting member 555 can be secured to housing 550 in a variety of ways. For example, mounting plate 550 can be fastened to housing 550 via adhesive, straps, bolts, rivets or any other suitable fasteners. In any event, mounting member 555 contacts housing 550 such that heat can be readily transferred from housing 550 to mounting member 555 which in turn transfers the heat to piping system 556. The coolant passing through, piping system 556 removes the heat from housing 550, mounting member 555 and piping system 556. In this embodiment, piping system 556 has an inlet opening 560 and an outlet opening 562.

The piping system 556 is looped back and forth between inlet opening 560 and outlet opening 562 to create a coolant chamber 524 therebetween. Inlet opening 560 is connected to an external conduit path via conduit 30b, while outlet opening 562 is connected to an external conduit path via conduit 30a. Conduits 30a and 30b can be coupled to inlet and outlet openings 560 and 562 by one-way valves in the same manner as in the first embodiment, if needed and/or desired.

Cooling system or unit 520 can be used with the pump 25 and/or radiator 26 of the first embodiment as needed and/or desired. Alternatively, it will be apparent to those skilled in the art from this disclosure that pump 25 and/or radiator 26 can be eliminated. For example, the conduit path can be set up as a "coffee percolator" such that the coolant is self-circulating through coolant member 524. Cooling system or unit 520 is especially adapted for use as a self-circulating system in that the outlet opening 562 is located higher than the inlet opening 560. This arrangement allows the coolant to percolate through coolant member 524.

Disc brake caliper 521 is substantially identical to disc brake caliper 21 of the first embodiment except that the internal coolant member 24 of the first embodiment has been replaced with an external cooling system or unit 520. In view of the similarities between disc brake caliper 521 and disc brake caliper 21 of the first embodiment, disc brake caliper 521 will not be discussed or illustrated in detail herein. Moreover, brake operating mechanism 23 or the first embodiment is designed to be attached to housing 550 for supplying an actuating fluid to the first and second halves of housing 550 in substantially the same manner as in the first embodiment. In other words, conduit 86 of the brake operating mechanism 23 is attached to the housing 550 in a conventional manner to supply actuating fluid thereto for selectively gripping brake disc 22.

SEVENTH EMBODIMENT

Figure 19:
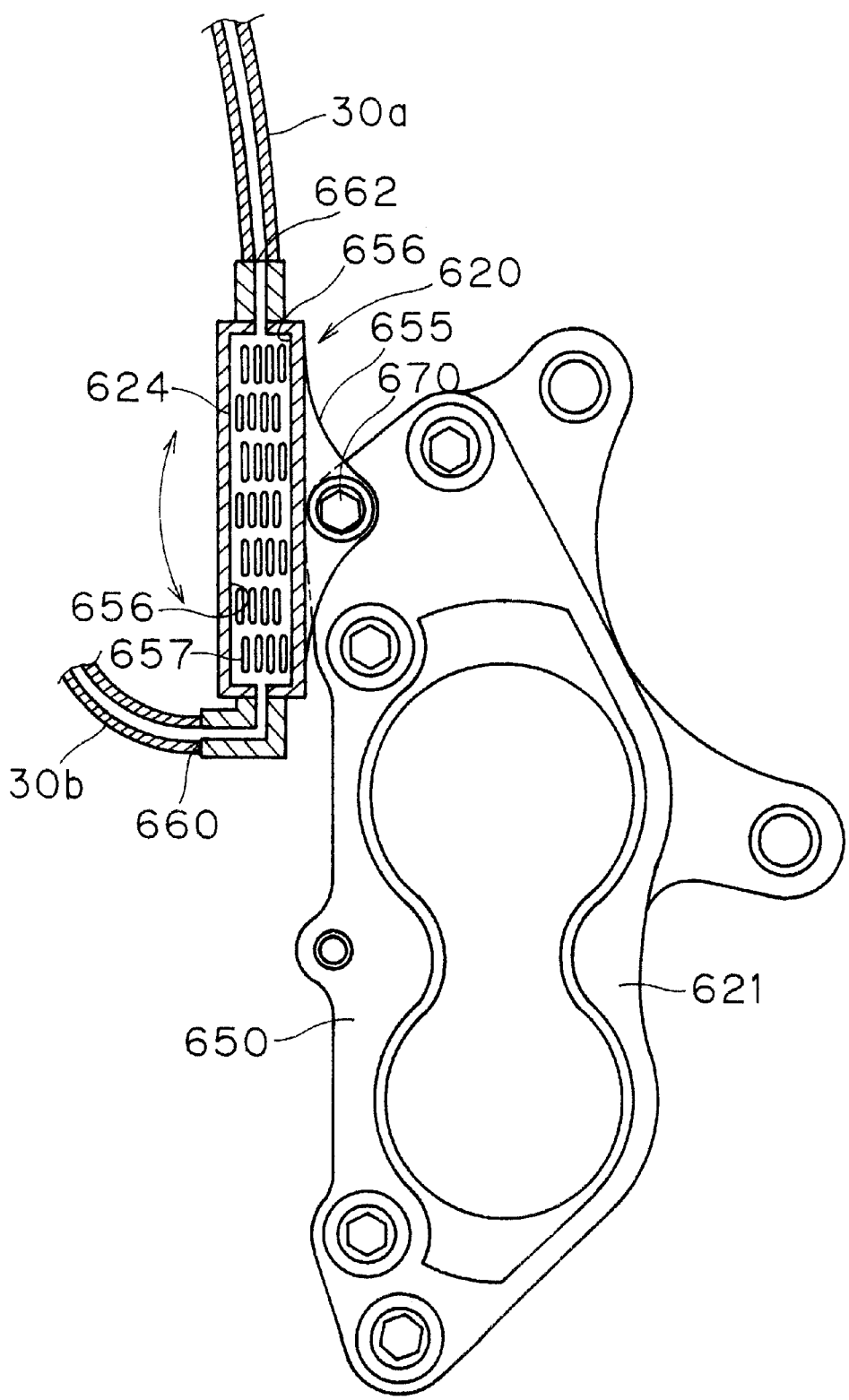
FIG. 19 is a side elevational view of a bicycle disc brake caliper with an adjustable and replaceable coolant chamber or member in accordance with another embodiment of the present invention.

Referring now to FIG. 19, a modified disc brake caliper 621 is illustrated in accordance with the present invention. In this embodiment, a detachable and replaceable cooling system or unit 620 is fixedly attached to the disc brake caliper 621. Cooling system or unit 620 includes a mounting member or an attachment portion 655 and an elongated coolant portion or member 624. Cooling system or unit 620 is adjustably mounted to housing 650 via a mounting bolt 670. Preferably, coolant member 624 is normally adjusted to be oriented in a substantially vertical direction relative to the ground. In particular, the mounting member 655 is a flange with a hole for receiving bolt 670 therethrough to adjustably secure coolant member 624 thereto.

As seen in FIG. 19, coolant member 620 has an internal coolant area 656, a lower inlet opening 660 and an upper outlet opening 662. In this embodiment, internal coolant area 656 of coolant member 624 has a plurality of internal baffles 657. The lower inlet opening 660 is located at a first longitudinal end of coolant member 624, while the upper outlet opening 662 is located at a second longitudinal end of coolant member 624. Inlet opening 660 is connected to an external conduit path via conduit 30b, while outlet opening 662 is connected to an external conduit path via conduit 30a. Conduits 30a and 30b can be coupled to inlet and outlet openings 560 and 562 by one-way valves in the same manner as in the first embodiment, if needed and/or desired.

As mentioned above, coolant member 624 is angularly adjustable relative to the bicycle disc brake caliper 621 to position its outlet opening 662 substantially perpendicular relative to ground, when attachment portion 655 is coupled to bicycle disc brake caliper 621. Cooling system or unit 620 can be used with pump 25 and/or radiator 26 of the first embodiment as needed/desired. Alternatively, it will be apparent to those skilled in the art from this disclosure that pump 25 and/or radiator 26 can be eliminated. For example, this design is especially useful in creating a conduit path that can be set up as a "coffee percolator" such that the coolant is self-circulating through coolant member 624. Cooling system or unit 620 is especially adapted for use as a self-circulating system in that the outlet opening 662 is located higher than the inlet opening 660. This arrangement allows the coolant to percolate through coolant member 624.

Disc brake caliper 621 is substantially identical to disc brake caliper 21 of the first embodiment except that the internal coolant member 24 of the first embodiment has been replaced with an external cooling system or unit 620. In view of the similarities between disc brake caliper 621 and disc brake caliper 21 of the first embodiment, disc brake caliper 621 will not be discussed or illustrated in detail herein. Moreover, brake operating mechanism 23 or the first embodiment is designed to be attached to housing 650 for supplying an actuating fluid to the first and second halves of housing 650 in substantially the same manner as in the first embodiment. In other words, conduit 86 of the brake operating mechanism 23 is attached to the housing 650 in a conventional manner to supply actuating fluid thereto for selectively gripping brake disc 22.

While several embodiments have been chosen to illustrate the present invention, it will be apparent to those skilled in the art from this disclosure that various changes and modifications can be made herein without departing from the scope of the invention as defined in the appended claims. Furthermore, the foregoing description of the preferred embodiments of the present invention is provided for illustration only, and not for the purpose of limiting the invention as defined by the appended claims and their equivalents.

What is claimed is:

1. A detachable fluid cooling system for a bicycle disc brake caliper, comprising:

an attachment portion with a contact surface sized to be detachably coupled to an external surface of the bicycle disc brake caliper; and a coolant portion coupled to said attachment portion to form a cooling unit that is separate from the bicycle disc brake caliper to transfer heat from the bicycle disc brake caliper, said coolant portion having an internal coolant area for containing coolant, said coolant portion including a piping system that at least partially defines said coolant area.

2. The detachable fluid cooling system according to claim 1, wherein said piping system extends back and forth in a zigzag pattern.

3. The detachable fluid cooling system according to claim 2, wherein said attachment portion is elongated and said piping system extends back and forth in a lengthwise direction of said elongated attachment portion.

4. The detachable fluid cooling system according to claim 2, wherein said coolant portion includes a first opening to fill said coolant area with coolant and a second opening to permit the coolant to exit said coolant area.

5. The detachable fluid cooling system according to claim 4, wherein an external coolant path extends between said first and second openings.

6. The detachable fluid cooling system according to claim 5, wherein said coolant path includes a radiator to dissipate heat from coolant passing therethrough.

7. The detachable fluid cooling system according to claim 5, wherein said coolant path further includes a pump to circulate coolant through said coolant area.

8. The detachable fluid cooling system according to claim 7, wherein said pump includes a temperature sensor mounted to said housing for at least partially controlling activation and deactivation of said pump.

9. The detachable fluid cooling system according to claim 7, wherein said pump includes a three position switch for selecting an on position, a temperature sensing position and an off position.

10. The detachable fluid cooling system according to claim 7, wherein
said pump is driven by an electric motor.

11. The detachable fluid cooling system according to claim 10, wherein
said electric motor is battery operated.

12. The detachable fluid cooling system according to claim 4, wherein
said piping system completely defines said coolant area such that a first end of said piping system forms said first opening and a second end of said piping system forms said second opening.

13. The detachable fluid cooling system according to claim 4, wherein
said coolant portion is elongated with said first opening arranged adjacent a first longitudinal end and said second opening arranged adjacent a second longitudinal end.

14. The detachable fluid cooling system according to claim 1, further comprising
a coolant reservoir fluidly coupled to said coolant area of said coolant portion.

15. A detachable fluid cooling system for a bicycle disc brake, comprising:
a bicycle disc brake caliper; and
a cooling unit coupled to said bicycle disc brake caliper, said cooling unit being separate from said bicycle disc brake caliper and including
an attachment portion with a contact surface detachably coupled to an external surface of said bicycle disc brake caliper, and
a coolant portion coupled to said attachment portion to transfer heat from said bicycle disc brake caliper, said coolant portion having an internal coolant area for containing coolant, said coolant portion including a piping system that at least partially defines said coolant area.

16. The detachable fluid cooling system according to claim 15, wherein
said piping system extends back and forth in a zigzag pattern.

17. The detachable fluid cooling system according to claim 16, wherein
said attachment portion is elongated and said piping system extends back and forth in a lengthwise direction of said elongated attachment portion.

18. The detachable fluid cooling system according to claim 16, wherein
said coolant portion includes a first opening to fill said coolant area with coolant and a second opening to permit the coolant to exit said coolant area.

19. The detachable fluid cooling system according to claim 18, wherein
an external coolant path extends between said first and second openings.

20. The detachable fluid cooling system according to claim 19, wherein
said coolant path includes a radiator to dissipate heat from coolant passing therethrough.

21. The detachable fluid cooling system according to claim 19, wherein
said coolant path further includes a pump to circulate coolant through said coolant area.

22. The detachable fluid cooling system according to claim 21, wherein
said pump includes a temperature sensor mounted to said housing for at least partially controlling activation and deactivation of said pump.

23. The detachable fluid cooling system according to claim 21, wherein
said pump includes a three position switch for selecting an on position, a temperature sensing position and an off position.

24. The detachable fluid cooling system according to claim 21, wherein
said pump is driven by an electric motor.

25. The detachable fluid cooling system according to claim 24, wherein
said electric motor is battery operated.

26. The detachable fluid cooling system according to claim 15, further comprising
a coolant reservoir fluidly coupled to said coolant area of said coolant portion.

27. The detachable fluid cooling system according to claim 15, wherein
said attachment portion has a contact surface at least as large as a piston recess of said bicycle disc brake caliper.

28. The detachable fluid cooling system according to claim 15, wherein
said attachment portion has a contact surface at least as large as a pair of adjacent piston recesses of said bicycle disc brake caliper.

29. The detachable fluid cooling system according to claim 15, wherein
said attachment portion is coupled to said external surface of said bicycle disc brake caliper by adhesive.

\* \* \* \* \*